United States Patent
Johnson et al.

(10) Patent No.: US 9,604,684 B1
(45) Date of Patent: Mar. 28, 2017

(54) FLASHING HEADLIGHT FOR A MOTORCYCLE

(71) Applicants: Vickie Johnson, Altamonte Springs, FL (US); Shaun Williams, Altamonte Springs, FL (US); Reginald Brantley, Altamonte Springs, FL (US)

(72) Inventors: Vickie Johnson, Altamonte Springs, FL (US); Shaun Williams, Altamonte Springs, FL (US); Reginald Brantley, Altamonte Springs, FL (US)

( * ) Notice: Subject to any disclaimer, the term of this patent is extended or adjusted under 35 U.S.C. 154(b) by 0 days.

(21) Appl. No.: 14/734,079

(22) Filed: Jun. 9, 2015

(51) Int. Cl.
| B60Q 1/14 | (2006.01) |
| B62J 6/02 | (2006.01) |
| H05B 37/02 | (2006.01) |
| B62J 6/00 | (2006.01) |
| H05B 33/08 | (2006.01) |
| B60Q 1/02 | (2006.01) |

(52) U.S. Cl.
CPC ........... B62J 6/02 (2013.01); B60Q 1/02 (2013.01); B62J 6/001 (2013.01); H05B 33/08 (2013.01); H05B 37/0218 (2013.01); H05B 37/0263 (2013.01); H05B 37/0281 (2013.01)

(58) Field of Classification Search
CPC .......... H05B 33/08; H05B 37/02; B60Q 1/02
USPC ............... 315/77, 82, 86, 152, 294; 362/473
See application file for complete search history.

(56) References Cited

U.S. PATENT DOCUMENTS

| 3,989,980 A | 11/1976 | Berman | |
| 4,127,844 A | 11/1978 | Purdy | |
| 4,206,498 A | 6/1980 | Kader | |
| D273,235 S | 3/1984 | Ogishima | |
| 4,550,305 A | 10/1985 | Bookbinder | |
| 5,264,826 A | 11/1993 | Henderson | |
| 5,754,097 A | 5/1998 | Vredenburgh | |
| 5,914,651 A | 6/1999 | Smalls | |
| 6,152,585 A | 11/2000 | Barry | |
| 6,731,202 B1 * | 5/2004 | Klaus | B60Q 1/525 340/425.5 |
| 2005/0180150 A1* | 8/2005 | Okada | B62J 6/02 362/473 |
| 2010/0079266 A1 | 4/2010 | Holt | |
| 2011/0187517 A1* | 8/2011 | Roths | B62J 6/00 340/432 |
| 2011/0295454 A1* | 12/2011 | Meyers | B62J 17/00 701/22 |
| 2011/0320063 A1* | 12/2011 | Molinaro | B62K 11/14 701/1 |

* cited by examiner

Primary Examiner — Tung X Le

(57) ABSTRACT

The flashing headlight for a motorcycle is a safety device for motorcycles and other vehicles such as all-terrain vehicles or bicycles. It is a supplemental headlight that is mounted by the headlight of a vehicle. An embodiment of the disclosure meets the needs presented above by generally comprising a flashing headlight for a motorcycle that flashes once per second to alert other drivers on the road to the position of the motorcycle. The flashing headlight for a motorcycle is intended to be operated only during daylight hours and includes circuitry to disable operation in darkness.

8 Claims, 4 Drawing Sheets

FLASHING HEADLIGHT FOR A MOTORCYCLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of motorcycle accessories, more specifically, an accessory configured for use with a motorcycle, and which provides a flashing light for increased visibility of the motorcycle.

SUMMARY OF THE INVENTION

The flashing headlight for a motorcycle is a safety device for motorcycles and other vehicles such as all-terrain vehicles or bicycles. It is a supplemental headlight that is mounted over the headlight of a vehicle. An embodiment of the disclosure meets the needs presented above by generally comprising a flashing headlight for a motorcycle that flashes once per second to alert other drivers on the road to the position of the motorcycle. The flashing headlight for a motorcycle is intended to be operated only during daylight hours and includes circuitry to disable operation in darkness. The flashing headlight for a motorcycle is comprised of a powering member, a master switch, a supplemental headlight, a central processing unit, a light sensing member and wiring.

These together with additional objects, features and advantages of the flashing headlight for a motorcycle will be readily apparent to those of ordinary skill in the art upon reading the following detailed description of presently preferred, but nonetheless illustrative, embodiments of the flashing headlight for a motorcycle when taken in conjunction with the accompanying drawings.

In this respect, before explaining the current embodiments of the flashing headlight for a motorcycle in detail, it is to be understood that the flashing headlight for a motorcycle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the flashing headlight for a motorcycle.

It is therefore important that the claims be regarded as including such equivalent construction insofar as they do not depart from the spirit and scope of the flashing headlight for a motorcycle. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
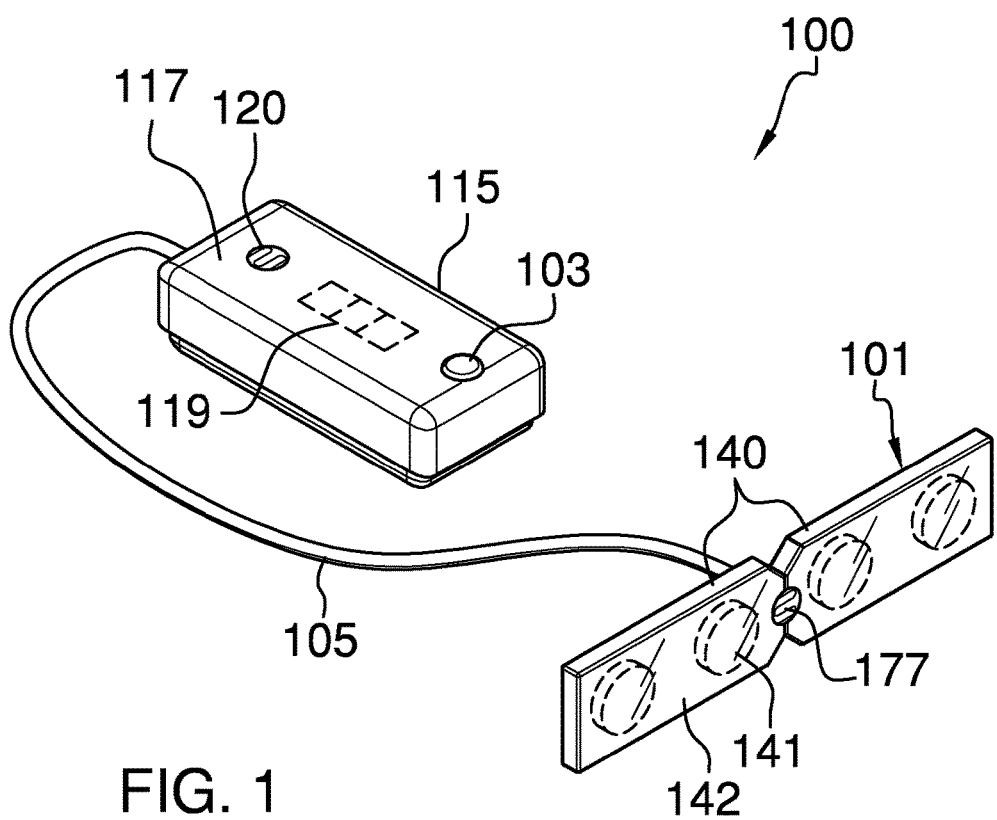
FIG. 1 is a perspective view of an embodiment of the disclosure.
Figure 2:
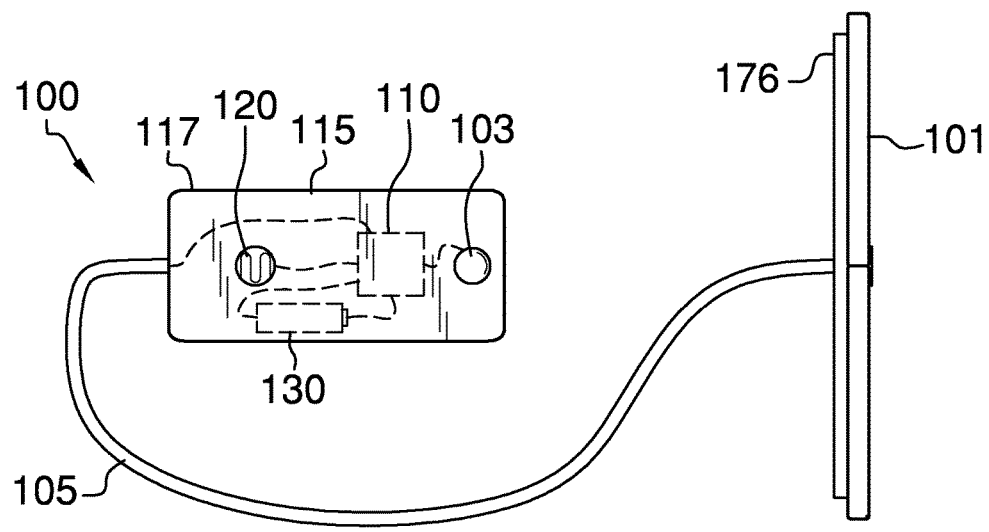
FIG. 2 is a top view of an embodiment of the disclosure.
Figure 3:
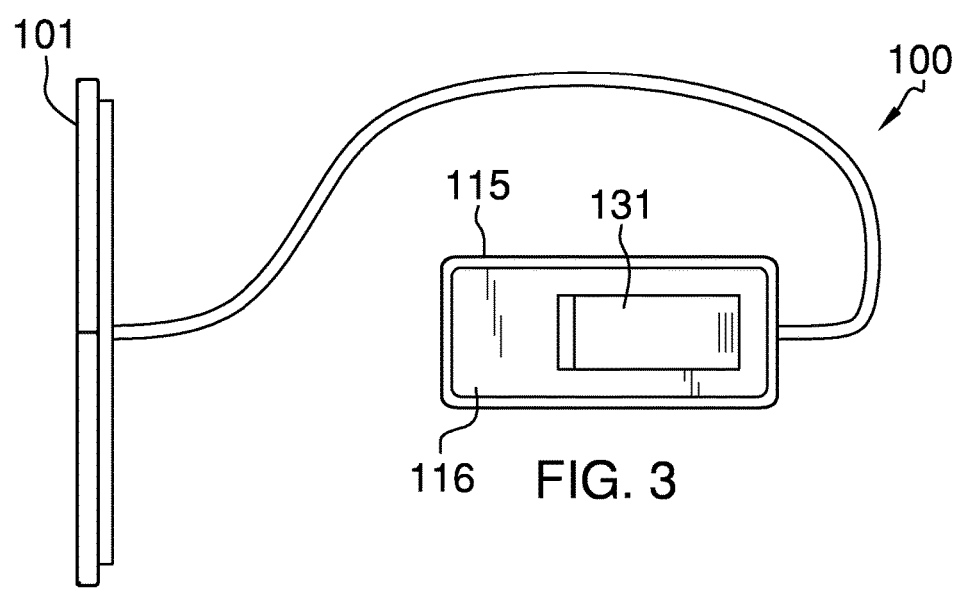
FIG. 3 is a bottom view of an embodiment of the disclosure.
Figure 4:
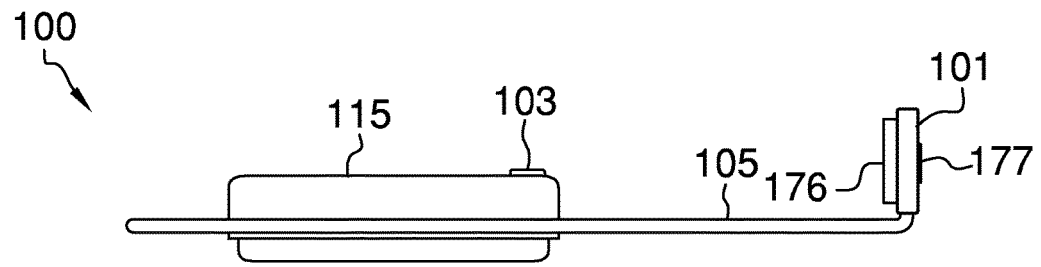
FIG. 4 is a side view of an embodiment of the disclosure.
Figure 5:
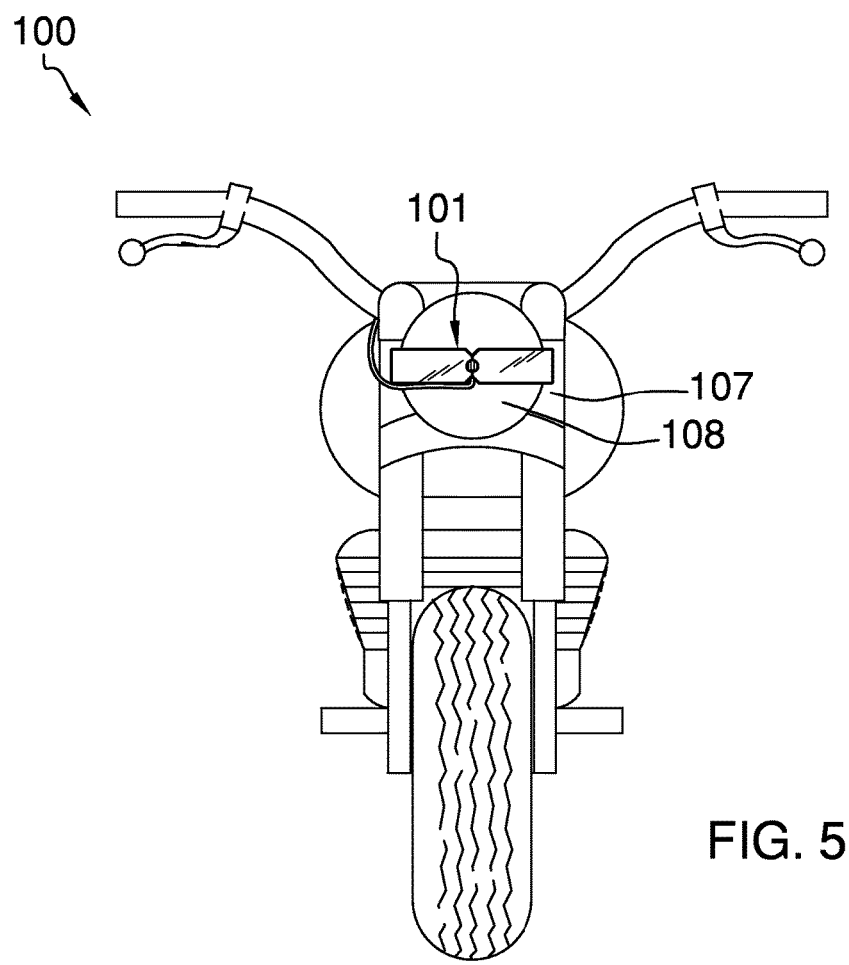
FIG. 5 is a view of an embodiment of the disclosure in use.
Figure 6:
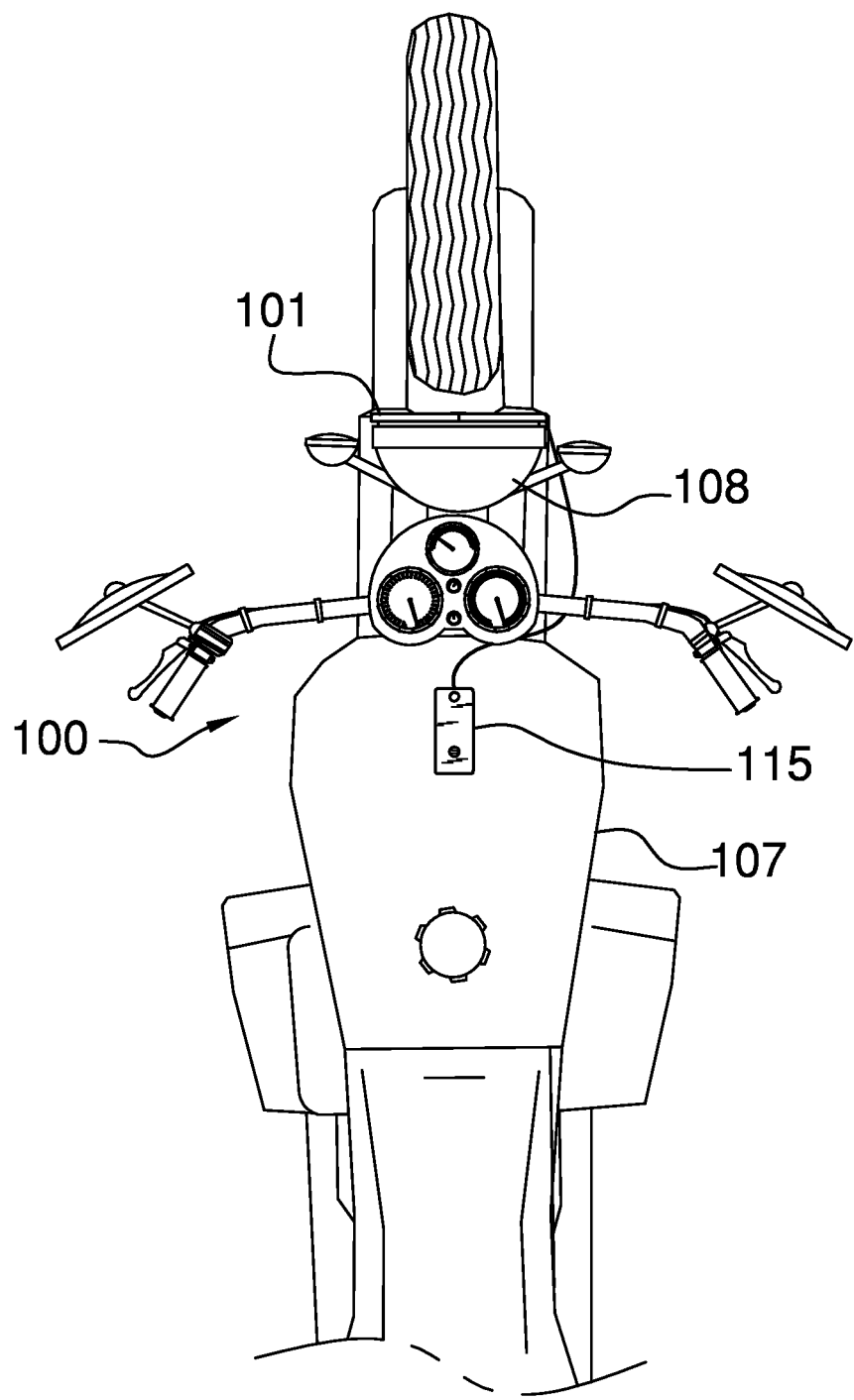
FIG. 6 is a top view of an embodiment of the disclosure in use.

As best illustrated in FIGS. 1 through 6, the flashing headlight for a motorcycle 100 (hereinafter invention) generally comprises a supplemental headlight 101, a central processing unit 110, a light sensing member 120, a master switch 103, a powering member 130, and a cable 105. The function of the invention 100 is to increase the visibility of an operating motorcycle 107, or other vehicle, by flashing the supplemental headlight 101 in a two-second cycle comprising one second of the supplemental headlight 101 being powered and lit and one second of the supplemental headlight 101 being unpowered and unlit. Moreover, the invention 100 is configured for use with the motorcycle 107, and is easily installed onto said motorcycle 107.

The central processing unit 110 is responsible for operating the supplemental headlight 101. Moreover, the central processing unit 110 is responsible for operating the two-second cycle that turns the supplemental headlight 101 on for one second, and then turns off the supplemental headlight 101 for one second.

The master switch 103 is responsible for turning on or off the invention 100. Moreover, the master switch 103 controls the electricity provided via the powering member 130 to the central processing unit 110. The master switch 103 is in wired connection with the central processing unit 110. The light sensing member 120 prevents the powering of the supplemental headlight 101 when the light sensing member 120 does not detect daylight. This prevents the supplemental headlight 101 from becoming a dangerous distraction to other drivers during nighttime use of the invention 100.

When the master switch 103 is open, electricity is not available to the central processing unit 110 via the powering member 130. When the switch is closed, power is available to operate the invention 100. The master switch 103 is a single pole switch selected from one of the following configurations: toggle switch, rocker switch or push button switch. Optionally, a light emitting diode may be placed in series with the master switch 103 to provide a visual power-on signal.

The central processing unit 110 is housed within a housing member 115. The housing member 115 also includes the light sensing member 120 as well as the powering member 130. The powering member 130 may include at least one battery, which is located inside of a battery compartment 131 located on a rear housing surface 116 of the housing member 115. It shall be noted that the powering member 130 may involve a wire that connects directly into the electrical system of the motorcycle 107. Optionally, at least one solar cell 119 may be included on a top housing surface 117 of the housing member 115. The at least one solar cell 119 would be in wired connection with the powering member 130 in order to supply electricity to the invention 100.

The purpose of the light sensing member is to operate a switching device that disables the operation of the invention in darkness. The light sensing member is generally comprised of a light sensor 102, a switching device and some simple logic circuitry described below.

It shall be noted that the light sensing member 120 may be a photoresistor, a phototransistor, or a solar cell. When the light sensing member 120 is a photoresistor, the photoresistor can be placed into a simple voltage divider powered by the powering member 130. In the dark, photoresistors have a nominal resistance in the megaohm range. When exposed to light, the resistance of the photoresistor will fall to the low kilo-ohm range. This change in resistance will result in a change in voltage that can be used to signal a transistor or relay to enable the operation of the central processing unit 110, and the supplemental headlight 101.

Take as an example a circuit where the power supply is connected to the photoresistor, the second end of the photoresistor is connected to a second resistor of approximately 10 kilo-ohm, and the second end of the second resistor is connected to ground. When this circuit is exposed to light, the voltage between the photoresistor and the second resistor would increase signaling the presence of light. When the sensor is a phototransistor, the phototransistor can be used with a pull-up resistor in a circuit powered by the powering member 130. For example, when used with a pull up resistor, the voltage at the collector will go high when the phototransistor is exposed to light.

When the sensor is a solar cell, the solar cells will provide a high voltage signal when light is present. However, solar cells can also be used to power the invention 100. In a solar powered configuration, the signal voltage is also the power voltage. Because of this, the role of the master switch 103 is changed to control the flow of power from the solar cells/light sensing member into the timer system and supplemental headlight 101.

In the above light sensor configurations the control voltage was assumed to go high in the presence of light. It should be noted that one skilled in the art may desire, and would be readily able to modify arrangement of the above components, so that the control voltage would go low in the presence of light. It should also be noted that switching circuits and devices, including but not limited to transistors and relays, are well known and documented in the art to take and use the light sensing control signal to power or disable the timing circuits and supplemental headlight 101. Commercially available combination light sensor and switching devices may also be used.

The purpose of the central processing unit 110 is to apply a timing circuit in order to apply power to the supplemental headlight 101 for one second and to then remove power to the supplemental headlight 101 for one second. It should be noted that a timing circuits are well known and documented in the art and a person skilled in the art would be able to design the timing circuit using any one of several design strategies including, but not limited to: 1) the use of a "555" type integrated circuit; 2) a circuit network comprising a combination of resistors, capacitors, transistors, and diodes; or, 3) a combination of resistors, capacitors and diodes used in conjunction with operational amplifiers. Commercially available switching element-timer combination devices may also be used.

The supplemental headlight 101 is comprised of at least one enclosure 140, at least one headlamp 141, and at least one lens 142. The at least one headlamp 141 is mounted into the enclosure 140 and the at least one lens 142 is placed in front of the at least one headlamp 141 to focus and aim the light forward. The at least one enclosure 140 may include a second light sensing member 177, which is wired to the central processing unit 110 via the cable 105. The second light sensing member 177 works in concert with the light sensing member 120 mentioned above. The at least one headlamp 141 may be tungsten, halogen or LED based. The supplemental headlight 101 is mounted over a motorcycle headlight 108. The supplemental headlight 101 is secured against the motorcycle headlight 108 via an adhesive member 176. The cable 105 is used to provide power from the housing member 115 to the supplemental headlight 101. Methods to mount the housing member 115 in place include clamping, bolting, screwing, or gluing.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A flashing headlight for a motorcycle comprising:
   a supplemental headlight adapted to be secured onto a motorcycle over a motorcycle headlight;
   said supplemental headlight is wired to a central processing unit;
   said central processing unit is responsible for generating a two-second cycle for the supplemental headlight such that the supplemental headlight is turned on for one second, and then turned off for one second;
   said two-second cycle increases overall visibility for the motorcycle;
   wherein a light sensing member is in wired connection with the central processing unit;
   wherein a master switch is in wired connection with the central processing unit;
   wherein a powering member is in wired connection with the central processing unit;
   wherein a cable connects the supplemental headlight to the central processing unit;

wherein the master switch is responsible for turning on or off the supplemental headlight; wherein the master switch controls the electricity provided via the powering member to the central processing unit; wherein the master switch is in wired connection with the central processing unit; wherein the light sensing member prevents the powering of the supplemental headlight when the light sensing member does not detect daylight;

wherein the central processing unit is housed within a housing member; wherein the housing member includes the light sensing member and the powering member;

wherein the powering member includes at least one battery, which is located inside of a battery compartment located on a rear housing surface of the housing member;

wherein at least one solar cell is included on a top housing surface of the housing member; wherein the at least one solar cell is in wired connection with the powering member in order to supply electricity to the central processing unit; and wherein the supplemental headlight is comprised of at least one enclosure, at least one headlamp, and at least one lens; wherein the at least one headlamp is mounted into the enclosure and the at least one lens is placed in front of the at least one headlamp to focus and aim light forward.

2. The flashing headlight for a motorcycle according to claim 1, wherein the light sensing member consists of a photoresistor, a phototransistor, or a solar cell.

3. The flashing headlight for a motorcycle according to claim 1, wherein the at least one headlamp consists of a tungsten, halogen or LED based light; wherein the supplemental headlight is adapted to be mounted adjacent a motorcycle headlight of said motorcycle.

4. The flashing headlight for a motorcycle according to claim 3, wherein the at least one enclosure includes a second light sensing member thereon.

5. The flashing headlight for a motorcycle according to claim 4, wherein the second light sensing member is wired to the central processing unit via the cable.

6. The flashing headlight for a motorcycle according to claim 5, wherein the supplemental headlight is secured against the motorcycle headlight via an adhesive member.

7. A flashing headlight for a motorcycle comprising:
a supplemental headlight adapted to be secured onto a motorcycle over a motorcycle headlight;
said supplemental headlight is wired to a central processing unit;
said central processing unit is responsible for generating a two-second cycle for the supplemental headlight such that the supplemental headlight is turned on for one second, and then turned off for one second;
said two-second cycle increases overall visibility for the motorcycle; wherein a light sensing member is in wired connection with the central processing unit;
wherein a master switch is in wired connection with the central processing unit;
wherein a powering member is in wired connection with the central processing unit; wherein a cable connects the supplemental headlight to the central processing unit; wherein the master switch is responsible for turning on or off the supplemental headlight; wherein the master switch controls the electricity provided via the powering member to the central processing unit; wherein the master switch is in wired connection with the central processing unit; wherein the light sensing member prevents the powering of the supplemental headlight when the light sensing member does not detect daylight;
wherein the central processing unit is housed within a housing member; wherein the housing member also includes the light sensing member and the powering member; wherein the powering member includes at least one battery, which is located inside of a battery compartment located on a rear housing surface of the housing member; wherein at least one solar cell is included on a top housing surface of the housing member; wherein the at least one solar cell is in wired connection with the powering member in order to supply electricity to the central processing unit; and
wherein the light sensing member consists of a photoresistor, a phototransistor, or a solar cell; wherein the supplemental headlight is comprised of at least one enclosure, at least one headlamp, and at least one lens; wherein the at least one headlamp is mounted into the enclosure and the at least one lens is placed in front of the at least one headlamp to focus and aim light forward; wherein the at least one headlamp consists of a tungsten, halogen or LED based light; wherein the supplemental headlight is adapted to be mounted adjacent a motorcycle headlight of said motorcycle.

8. The flashing headlight for a motorcycle according to claim 7, wherein the at least one enclosure includes a second light sensing member thereon; wherein the second light sensing member is wired to the central processing unit via the cable; wherein the supplemental headlight is secured against the motorcycle headlight via an adhesive member.

* * * * *